US008858894B2

(12) United States Patent
Stöcklinger (10) Patent No.: US 8,858,894 B2
(45) Date of Patent: Oct. 14, 2014

(54) REACTOR FOR PRODUCING POLYCRYSTALLINE SILICON USING THE MONOSILANE PROCESS

(75) Inventor: Robert Stöcklinger, Feldkirchen-Westerham (DE)

(73) Assignee: Schmid Silicon Technology GmbH (DE)

( * ) Notice: Subject to any disclaimer, the term of this patent is extended or adjusted under 35 U.S.C. 154(b) by 500 days.

(21) Appl. No.: 13/144,715

(22) PCT Filed: Oct. 9, 2009

(86) PCT No.: PCT/EP2009/063198
§ 371 (c)(1),
(2), (4) Date: Aug. 30, 2011

(87) PCT Pub. No.: WO2010/083899
PCT Pub. Date: Jul. 29, 2010

(65) Prior Publication Data
US 2011/0305604 A1 Dec. 15, 2011

(30) Foreign Application Priority Data

Jan. 22, 2009 (DE) .......................... 10 2009 003 368

(51) Int. Cl.
| | | |
|---|---|---|
| B01J 19/00 | (2006.01) | |
| C01B 33/035 | (2006.01) | |
| F28D 7/00 | (2006.01) | |
| B01J 15/00 | (2006.01) | |
| B01J 19/24 | (2006.01) | |

(52) U.S. Cl.
CPC .......... *B01J 15/00* (2013.01); *B01J 2219/0078* (2013.01); *C01B 33/035* (2013.01); *B01J 19/24* (2013.01)
USPC ............................ 422/200; 422/129; 423/348

(58) Field of Classification Search
CPC ............ C01B 33/035; B01J 19/00; F28D 7/00
USPC .................................... 422/129, 200; 423/348
See application file for complete search history.

(56) References Cited

U.S. PATENT DOCUMENTS

| 1,532,649 | A | * | 4/1925 | Bieber ........................... 241/251 |
|---|---|---|---|---|
| 3,011,877 | A | * | 12/1961 | Schweickert et al. ......... 422/199 |
| 4,147,814 | A | * | 4/1979 | Yatsurugi et al. .............. 427/588 |
| 4,179,530 | A | | 12/1979 | Köppl et al. |

(Continued)

FOREIGN PATENT DOCUMENTS

| DE | 25 58 387 A1 | 7/1976 |
|---|---|---|
| DE | 10 2005 042753 A1 | 3/2007 |
| GB | 1 532 649 A | 12/1978 |
| JP | 6-285364 A | 10/1994 |

*Primary Examiner* — Walter D Griffin
*Assistant Examiner* — Huy-Tram Nguyen
(74) *Attorney, Agent, or Firm* — DLA Piper LLP (US)

(57) ABSTRACT

A reactor that produces polycrystalline silicon using a monosilane process includes a reactor base plate having a multiplicity of nozzles formed therein through which a silicon-containing gas flows, a plurality of filament rods mounted on the reactor base plate, and a gas outlet opening located at a selected distance from the nozzles to feed used monosilane to an enrichment and/or treatment stage, wherein the gas outlet opening is formed at a free end of an inner tube, the inner tube is conducted through the reactor base plate, and the inner tube has an outer wall and an inner wall and thus forms an intermediate space in which at least one cooling water circuit is conducted.

12 Claims, 7 Drawing Sheets

(56) References Cited

U.S. PATENT DOCUMENTS

| | | | |
|---|---|---|---|
| 4,724,160 A * | 2/1988 | Arvidson et al. | 438/466 |
| 5,041,308 A | 8/1991 | Kuramoto | |
| 5,382,419 A | 1/1995 | Nagai et al. | |
| RE36,936 E | 10/2000 | Keck et al. | |
| 6,749,824 B2 * | 6/2004 | Keck et al. | 423/348 |
| 7,922,990 B2 | 4/2011 | Hertlein et al. | |
| 2008/0241046 A1 | 10/2008 | Hertlein et al. | |

* cited by examiner

REACTOR FOR PRODUCING POLYCRYSTALLINE SILICON USING THE MONOSILANE PROCESS

RELATED APPLICATIONS

This is a §371 of International Application No. PCT/EP2009/063198, with an international filing date of Oct. 9, 2009 (WO 2010/083899 A1, published Jul. 29, 2010), which is based on German Patent Application No. 10 2009 003 368.8, filed Jan. 22, 2009, the subject matter of which is incorporated by reference.

TECHNICAL FIELD

This disclosure relates to a reactor for producing polycrystalline silicon using the monosilane process.

BACKGROUND

U.S. Pat. No. 4,179,530 discloses a process for the deposition of pure silicon. The reactor for this purpose consists of a double-walled container. Cooling water is conducted in the intermediate space formed by the two walls. The reactor comprises a plurality of thin U-shaped filaments on which the silicon precipitates. The clamps of the electrodes are likewise cooled. The gas is fed and removed through openings in the base plate of the reactor.

DE 25 58 387 discloses a process and a device for producing polycrystalline silicon. The polycrystalline silicon is produced by hydrogen reduction of silicon-containing compounds. Via a charging nozzle, the reaction partners are introduced into the reaction space. The used reaction partners are removed through the outlet via a line. Inlet and outlet are arranged to be opposite each other.

DE 10 2005 042 753 A1 discloses a process for producing granular polycrystalline silicon in a fluidized stream reactor. In the process for producing granular polycrystalline silicon, in a fluidized-bed reactor, which has a hot surface, the polycrystalline silicon is deposited from a reaction gas. This proceeds at a reaction temperature of 600 to 1100° C. The particles provided with the deposited silicon are removed from the reactor together with unreacted reaction gas and fluidizing gas.

US RE 36,936 discloses a process for producing high-purity polycrystalline silicon. In this case, the silicon is likewise obtained from the deposition of silicon-containing gas. The gas circulating in the chamber precipitates on the surfaces which are provided and cooled for this purpose. The circulation of the gas can be increased by means of a fan.

It could therefore be helpful to provide a reactor for producing polycrystalline silicon such that the removal of used silicon-containing gas (monosilane: $SiH_4$) is designed such that the efficiency of the reactor is not reduced and safe production of the polycrystalline silicon is ensured.

SUMMARY

I provide a reactor that produces polycrystalline silicon using a monosilane process including a reactor base plate having a multiplicity of nozzles formed therein through which a silicon-containing gas flows, a plurality of filament rods mounted on the reactor base plate, and a gas outlet opening located at a selected distance from the nozzles to feed used monosilane to an enrichment and/or treatment stage, wherein the gas outlet opening is formed at a free end of an inner tube, the inner tube is conducted through the reactor base plate, and the inner tube has an outer wall and an inner wall and thus forms an intermediate space in which at least one cooling water circuit is conducted.

DETAILED DESCRIPTION

The reactor includes a reactor base plate which has a multiplicity of nozzles formed therein. A silicon-containing gas flows through these nozzles. The silicon-containing gas is monosilane having the chemical formula $SiH_4$. In addition, a plurality of filament rods are mounted on the reactor base plate. A gas outle opening is formed by the nozzles, via which opening the used silicon-containing gas is fed to an enrichment and/or reprocessing stage. The gas outlet opening is formed at a free end of an inner tube. The inner tube in this case is conducted through the reactor base plate. The silicon-containing gas (monosilane) is removed thereby to an enrichment and/or treatment stage through the reactor base plate. Since the free end of the inner tube is markedly separated from the gas inlet nozzles of unused monosilane, a short circuit is avoided such that it is extremely improbable that freshly entering monosilane will be immediately removed again through the outlet opening to be subjected to an enrichment and/or treatment. The inner tube has an outer wall and an inner wall. An intermediate space is formed thereby in which at least one cooling water circuit is conducted. Advantageously, a first cooling water circuit and a second cooling water circuit may be formed in the intermediate space of the inner tube.

The inner tube is positioned in the center of the reactor base plate. In the reactor base plate, a multiplicity of gas outlet openings are likewise formed. Also, on the reactor base plate, a multiplicity of holders for the filament rods are provided, such that the gas outlet openings and the filament rods surround the inner tube.

The water cooling of the inner tube ensures an approximately equal process temperature at the filament rods. The inner tube is constructed to be double-walled to achieve the water cooling of the inner tube.

The reactor and the reactor base plate are likewise constructed as a double-walled jacket. Water for cooling is conducted into the intermediate space formed by the double-walled jacket.

The reactor base plate has a special design. The reactor base plate comprises a first region and a second region. The first region is formed by a plate facing the interior of the reactor and an intermediate plate which carries the nozzles. The second region of the reactor base plate is formed by the intermediate plate and a bottom plate which carries the supply connections for the filaments. The cooling water is conducted into the thus-formed first region to thereby cool the reactor base plate.

The monosilane is fed into the second region. Therefore, this can exit through the nozzles into the interior of the reactor. The nozzles are constructed as a cylindrical connection between the intermediate plate and the plate facing the interior of the reactor. This construction ensures that the monosilane situated in the second region passes safely into the interior of the reactor without coming into contact with the cooling water that is situated in the first region. The contact between water or air and the process gas (monosilane) must necessarily be avoided since otherwise there is an increased risk of explosion.

The supply connections for the filaments are constructed as a high-voltage connection and as cooling water connections.

The filaments themselves are located in a graphite adaptor. This graphite adaptor engages into a graphite clamping ring which itself interacts with the plate via a quartz ring. The cooling water connections for the filaments can be constructed in the form of quick-release couplings.

The inner tube is located in a pot on the bottom plate. The pot in this case is constructed such that it seals the first region and the second region. In the pot, in addition, a holder for the inner tube is conducted, wherein a radial seal seals the pot, the holder and the reactor space from one another. The inner tube itself has two separate cooling water circuits formed therein. The cooling water is supplied to the individual cooling water circuits of the inner tube via separate lines which are mutually connected to the inner tube likewise via quick-release couplings.

Starting from the inner tube, a discharge line is conducted for the used monosilane. This discharge line is conducted through the holder and the pot to thus discharge the monosilane below the reactor base plate.

Hereinafter, examples are intended to describe the reactor and the advantages thereof in more detail with reference to the accompanying figures.

Identical reference signs are used for identical or identically acting elements. In addition, for the sake of clarity, the only reference signs shown in the individual figures are those which are necessary for the description of the respective figure.

Figure 1:
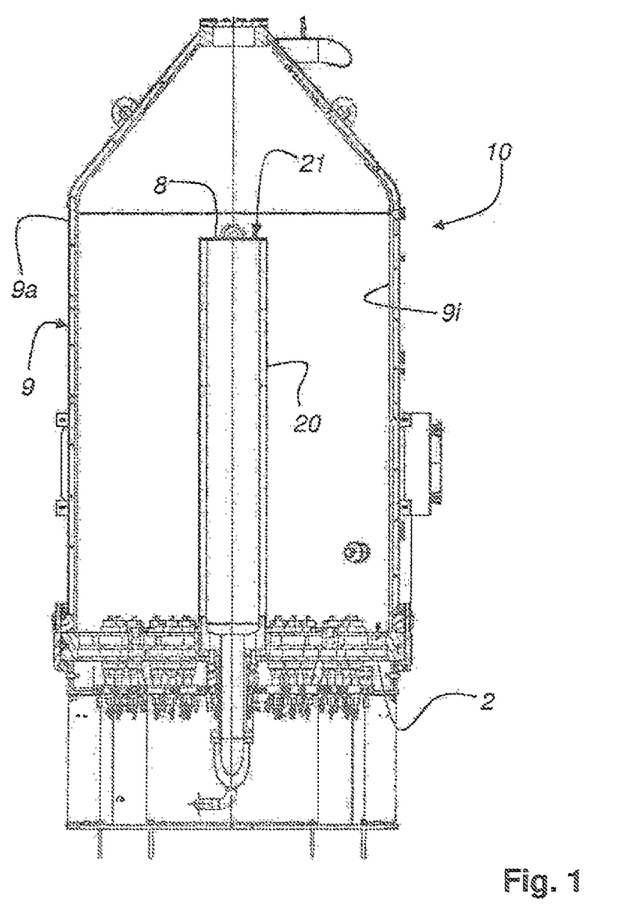
FIG. 1 shows a perspective sectional view through the reactor.

FIG. 1 shows a sectional view of the reactor 10. For the sake of clarity, some parts have been omitted. The reactor 10 consists of an outer wall 9 which is closed by a reactor base plate 2. The wall 9 of the reactor 10 consists of an outer wall 9a and an inner wall 9i. The outer wall 9a and the inner wall 9i are spaced apart from one another such that an intermediate space is formed thereby. In this intermediate space, cooling water is conducted to obtain a defined process temperature in the interior of the reactor 10. The reactor base plate 2 is also constructed of at least one intermediate space in which cooling water is likewise conducted. An inner tube 20 is arranged centrally in the interior of the reactor 10. The inner tube 20 has a free end which is spaced apart from the reactor base plate 2. This free end 21 of the inner tube 20 forms a gas outlet opening 8. Used monosilane can be passed through the gas outlet opening 8 to an enrichment and/or treatment stage. The used monosilane is discharged through the reactor base plate 2 in the case of the reactor 10.

Figure 2:
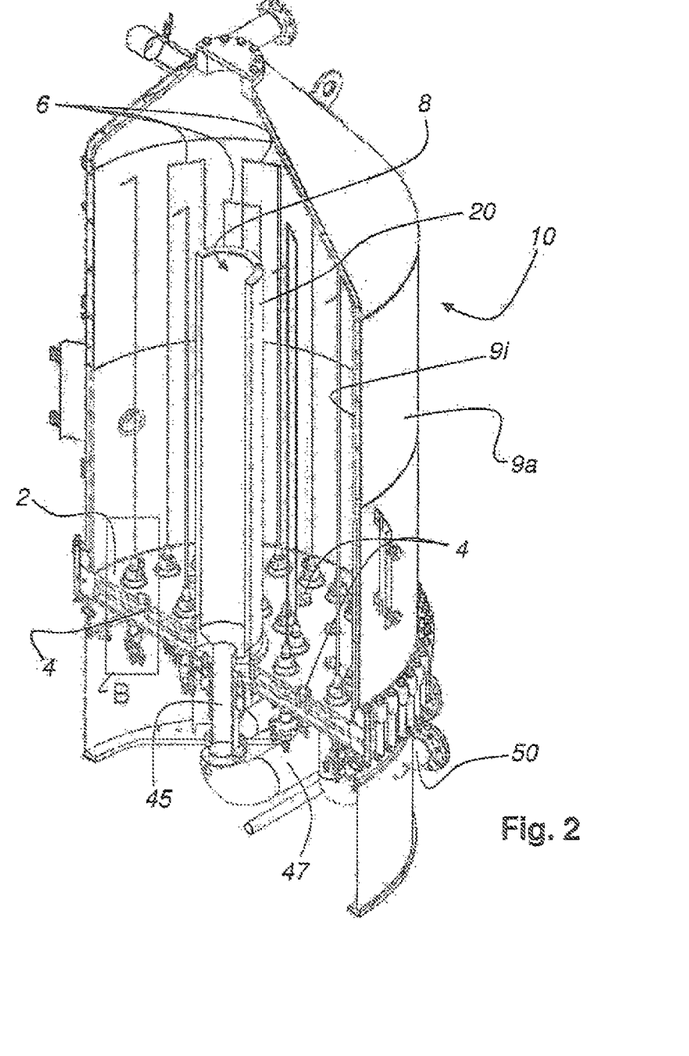
FIG. 2 shows a perspective sectional view through the reactor.

FIG. 2 shows a perspective sectional view of the reactor 10. The reactor base plate 2 has a multiplicity of nozzles 4 formed therein, through which the monosilane enters into the interior of the reactor 10. A multiplicity of filament rods 6 is likewise fastened to the reactor base plate, on which filament rods the polycrystalline silicon is deposited from the monosilane during the process. As already mentioned in the description for FIG. 1, the inner tube 20 has a gas outlet opening 8 through which the used monosilane is fed to an enrichment and/or treatment stage. The gas outlet opening 8 of the inner tube 20 here is clearly spaced apart from the reactor base plate 2. This is necessary to ensure that monosilane freshly entered into the reactor 10 immediately exits again through the gas outlet opening for used monosilane. The inner tube 20 is likewise of a double-walled construction and can therefore be cooled with water such that a constant process temperature always prevails on the filament rods 6. The inner tube 20 is conducted through the reactor base plate 2. The used monosilane is conducted by a discharge line 45 to the enrichment and/or reprocessing stage. A feed line 50 for fresh monosilane is likewise provided with the reactor base plate 2. This feed line 50 ends in the reactor base plate 2, which is of a multilayer construction. From there, the monosilane is distributed over the various nozzles 4 within the reactor base plate 2 and then enters into the interior of the reactor 10. The nozzles 4 and the filament rods 6 that are located in corresponding holders 7 are arranged equally distributed around the inner tube 20 which is arranged in the center of the reactor base plate 2.

Figure 3:
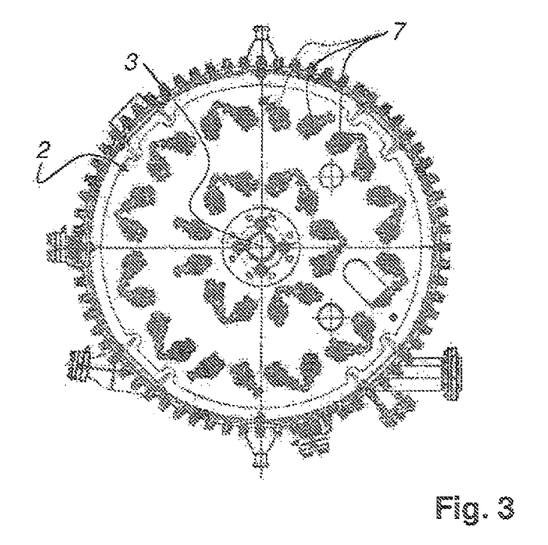
FIG. 3 shows a bottom view of the reactor, wherein the supply connections for the filaments may be recognized.

FIG. 3 shows a bottom view of the reactor base plate 2. The inner tube is fastened in the center 3 of the reactor base plate 2. The holders 7 and the supply connections 24, 26 for the filaments 6 are mounted around the center 3 of the reactor base plate. The filament rods 6 and the holders thereof 7 are supplied with cooling water and a high voltage from below the reactor base plate 2.

Figure 4:
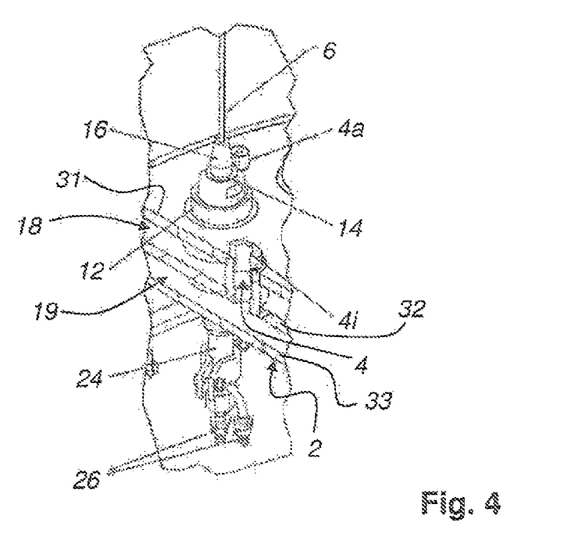
FIG. 4 shows an enlarged perspective depiction of the region of the reactor base plate indicated in FIG. 2 by B.

FIG. 4 shows an enlarged perspective representation of the region of the reactor 10 indicated in FIG. 2 by B. As already mentioned above, the reactor base plate is of a multilayer construction. The reactor base plate 2 consists of a first region 18 and a second region 19. The first region 18 is formed by a plate 31 facing the interior of the reactor 10 and an intermediate plate 32. The second region 19 is formed by the intermediate plate 32 and a bottom plate 33. Openings are formed in the intermediate plate 32, which openings carry the nozzles 4 for the monosilane. The nozzles end in the plate 31 facing the reactor space with an inner ring 4i. Over the inner ring 4i is pushed a corresponding outer ring 4a. The outer rings 4a are located on the plate 31 facing the reactor inner space and thus form the outlet openings for the monosilane. Consequently, the fresh silicon-containing gas is passed into the second region 19 and distributed appropriately in this second region 19 to enter into the reactor 10 through the nozzles 4. In the first region 18, cooling water is conducted.

The filaments 6 are located in a graphite adaptor 16. The graphite adaptor 16 engages into a clamping ring 14 made of graphite. The clamping ring 14 is in turn located in a quartz ring 12. Below the bottom plate, the supply connections 24 and 26 for the filament rods extend outward. The supply connection 24 serves for the power supply of the filaments 6. The supply connection 24 is constructed as a high-voltage electrode and supplies the filaments 6 with a high voltage of approximately 10 000 volts. The supply connections 26 are constructed as cooling water connections to keep the holders 7 of the filaments 6 to an appropriate process temperature. The filaments 6 themselves consist of a high-purity polysilicon rod which has a diameter of about 8 mm.

Figure 5:
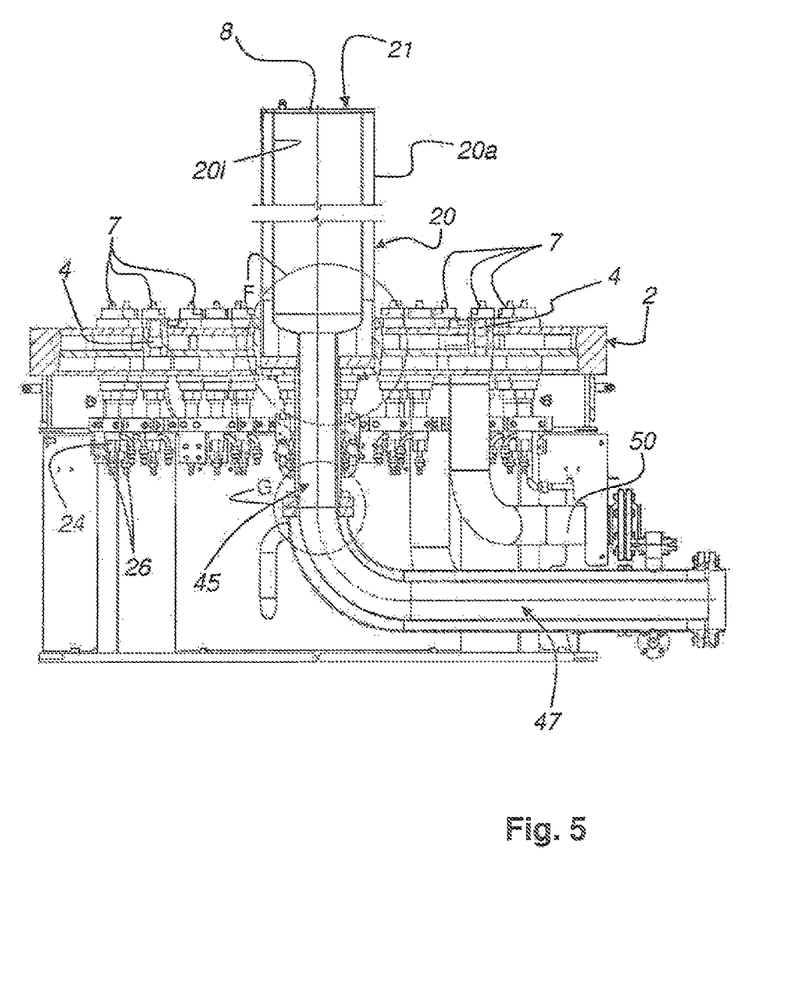
FIG. 5 shows a detailed view of the mounting of the inner tube on the reactor base plate.

FIG. 5 shows a representation of the installation of the inner tube 20 on the reactor base plate 2 of the reactor 10. As already mentioned repeatedly, the holders 7 for the filaments 6 are provided on the reactor base plate 2. The nozzles 4 for the monosilane are also formed in the reactor base plate 2. Below the reactor base plate 2, the supply connections 24 and 26 for the filaments are provided. The inner tube 20 consists of an outer wall 20a and an inner wall 20i. In the intermediate space formed by the outer wall 20a and the inner wall 20i, cooling water can be conducted. Via the gas outlet opening 8 of the inner tube 20, the inner tube is tapered and opens out into the discharge line 45. The discharge line 45 passes straight through the reactor base plate 2. There is then a deflection such that a further discharge line 47 subsequent to the discharge line 45 runs parallel to the reactor base plate 2 and thereby passes out the used monosilane from the region of the reactor below the reactor base plate 2. Likewise, the fresh monosilane is introduced from below at the reactor base plate 2 by a feed line 50.

Figure 6:
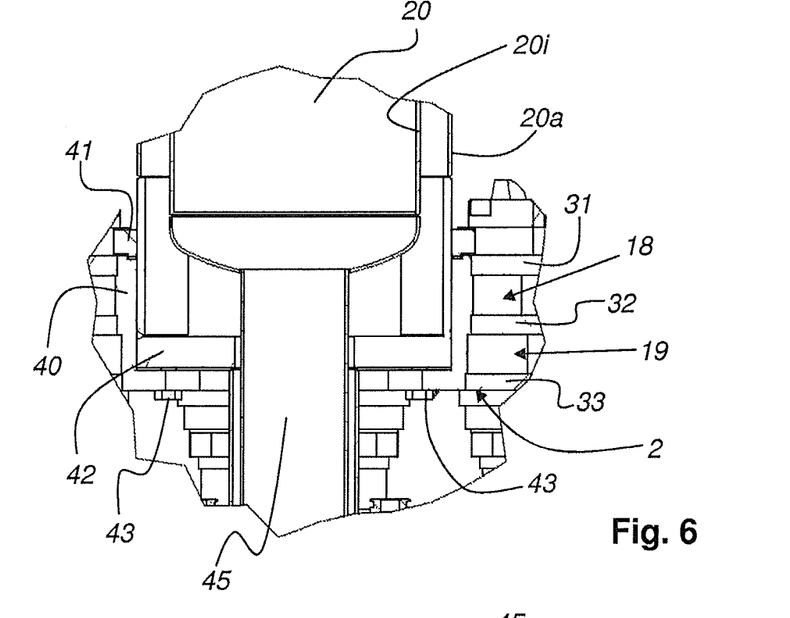
FIG. 6 shows an enlarged depiction of the region indicated in FIG. 5 by F.

FIG. 6 shows an enlarged depiction of the region indicated in FIG. 5 by F which shows the fastening and installation of the inner tube 20 on the reactor base plate 2. As already mentioned, the inner tube 20 is formed from an outer wall 20a and an inner wall 20i. The inner tube 20 is located in a pot 40 which radially seals the first region 18 and the second region 19 of the reactor base plate 2. A holder 42 in which the inner tube 20 is located is fitted into the pot 40. The holder 42 in addition carries a radially surrounding seal 41 which thereby seals the pot 40, the holder 42 and the interior of the reactor 10 from one another. In the region of the holder 42 the inner tube is of a tapered structure and forms thereby a discharge line 45 which is conducted perpendicularly through the reactor base plate 2. The holder 42 is firmly connected to the bottom plate 33 of the reactor base plate with a plurality of bolts.

Figure 7:
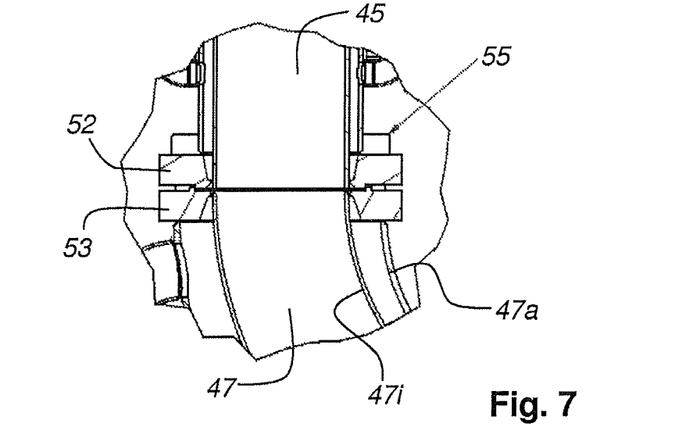
FIG. 7 shows an enlarged depiction of the region indicated in FIG. 5 by G.

FIG. 7 shows the region indicated in FIG. 5 by G. The transition from the perpendicular discharge line 45 to a discharge line 47 running substantially in parallel to the reactor base plate 2 is shown. The perpendicular discharge line 47 has a flange 52 formed thereon which interacts with a curved transition of the discharge line 47. The curved transition of the discharge line 47 likewise has a corresponding flange 53 formed thereon. The flange 52 of the perpendicular discharge line 45 and the flange 53 of the further discharge line 47 are connected to one another with a plurality of bolts 55. The discharge line 47 finally running substantially in parallel to the reactor base plate 2 is likewise of a double-wall construction. The discharge line 47 therefore includes an outer wall 47a and an inner wall 47i.

Figure 8:
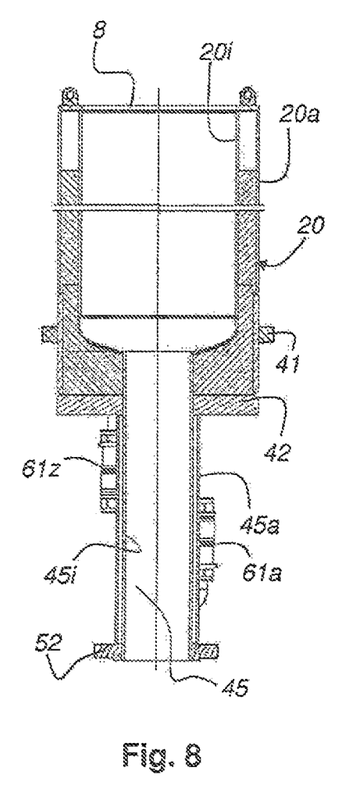
FIG. 8 shows a sectional view of the inner tube.

FIG. 8 shows a sectional representation of the inner tube 20 which is inserted into the reactor 10 to remove the used monosilane from the reactor and feed this gas to a treatment process. As already mentioned, the inner tube 20 is of a double-wall construction and consists of an outer wall 20a and an inner wall 20i. The gas outlet opening 8 through which the partially used monosilane enters into the inner tube 20 is provided opposite the holder 42 with the radially surrounding seal 41. In the region of the holder 42, the inner tube 20 opens out into a discharge line 45 tapering opposite the inner tube. This discharge line 45 is likewise of a double-wall construction and comprises thereby an outer wall 45a and an inner wall 45i. At the free end of the discharge line 45, the flange 52 is provided, via which the discharge line 45 can be mounted on a further discharge line 47 (see FIG. 7). A first feed line 61z and a second feed line 62z and also a first outlet line 61a and a second outlet line 62a for the cooling water are conducted externally on the discharge line 45.

Figure 9:
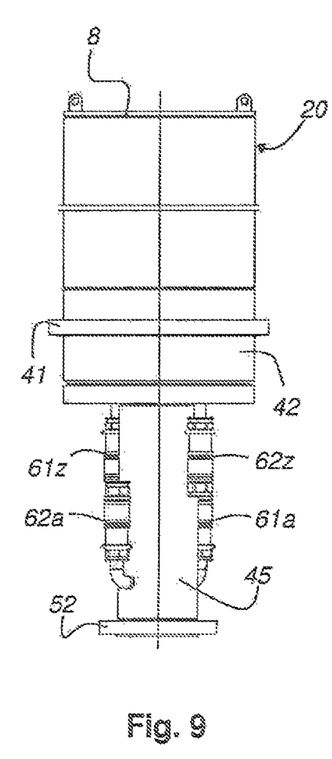
FIG. 9 shows a side view of the inner tube.

FIG. 9 shows a side view of the inner tube 20 which is installed in the reactor 10. The tapering from the diameter of the inner tube 20 to the diameter of the perpendicular discharge line 45 proceeds substantially in the interior of the holder 42 which is inserted into the pot 40 of the reactor base plate 2. The dimension of the inner tube 20 is constant thereby, and therefore shows no gradation which would possibly lead to sealing problems in the region of the reactor base plate, there at the first region 18 or at the second region 19. This is because it is of extreme importance in the process to keep the cooling water away from contact with the monosilane. As may be seen in FIGS. 8 and 9, the first and second feed lines 61z and 62z for the cooling water of the inner tube 20 are conducted externally on the discharge line 45. Similarly thereto, the first and second outlet line 61a and 62a of the cooling water from the inner tube 20 are conducted externally on the discharge line 45 for the monosilane. The connections for the throughflow of the cooling water are produced for the feed lines 61z and 62z and the outlet lines 61a and 62a via a quick-release coupling in each case.

Figures 10, 11:
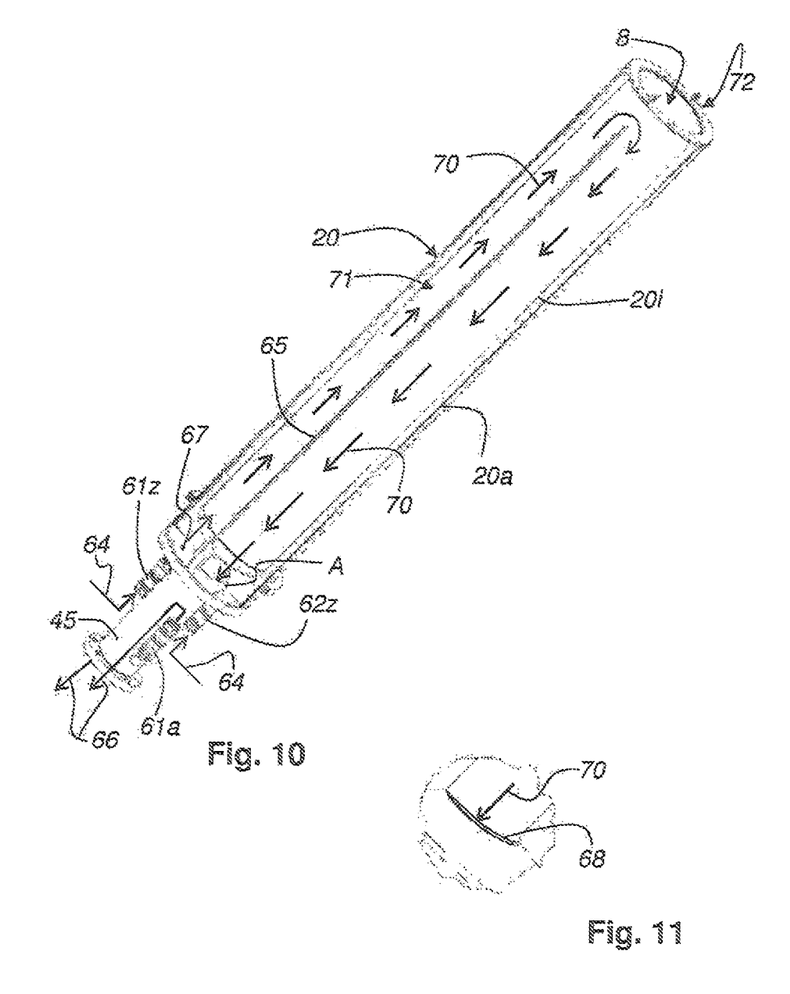
FIG. 10 shows the passage of the cooling water in the double wall of the inner tube.
FIG. 11 shows an enlarged depiction of the region indicated in FIG. 10 by A.

FIG. 10 shows a perspective view of the inner tube 20 from which the passage 70 of the cooling water within the intermediate space formed by the outer wall 20a and the inner wall 20i may be seen. A multiplicity of arrows shows the passage 70 of the cooling water in the intermediate space. Since a first feed line 61z and a second feed line 62z are provided, two cooling water circuits are formed in the intermediate space. The cooling water feed 64 to the first cooling water circuit 71 proceeds via the first feed line 61z. The cooling water feed 64 to the second cooling water circuit (which is not shown) proceeds via the second feed line 62z. The cooling water passes via an opening 67 into the intermediate space of the inner tube 20. The depiction of FIG. 11 shows in enlarged depiction the region indicated in FIG. 10 by A. The passage 70 of the cooling water exits from the intermediate space through a slot-shaped opening 68 and passes to the first outlet line 61a for the cooling water.

For formation of the passage 70 of the cooling water shown in FIG. 10, in the intermediate space a partition 65 is provided. This partition 65 ensures that the first cooling water circuit 71 proceeds from the opening 67 to the slot-shaped opening 68. From the slot-shaped opening 68, the cooling water is fed to a cooling water outlet 66 that is assigned to the first cooling water circuit 71 or to the second cooling water circuit.

Our reactor has been described with reference to a preferred example. However, it is obvious to those skilled in the art that structural modifications and changes can be carried out without departing from the scope of protection of the appended claims.

The invention claimed is:

1. A reactor that produces polycrystalline silicon using a monosilane process comprising:
   a reactor base plate having a multiplicity of nozzles formed therein through which a silicon-containing gas flows;
   a plurality of filament rods mounted on the reactor base plate; and
   a gas outlet opening located at a selected distance from the nozzles to feed used monosilane to an enrichment and/or treatment stage,
   wherein the gas outlet opening is formed at a free end of an inner tube, the inner tube is conducted through the reactor base plate, and the inner tube has an outer wall and an inner wall and thus forms an intermediate space in which at least one cooling water circuit is conducted.

2. The reactor as claimed in claim 1, wherein the inner tube is located in a center portion of the reactor base plate, and a multiplicity of gas outlet openings and holders for the filament rods surround the inner tube in the reactor base plate.

3. The reactor as claimed in claim 1, wherein the at least one cooling water circuit formed in the intermediate space of the inner tube ensures an approximately equal process temperature at the filament rods.

4. The reactor as claimed in claim 1, wherein the reactor and the reactor base plate are constructed as a double-walled jacket of an inner wall and an outer wall, and water for cooling is located in the double-walled jacket.

5. The reactor as claimed in claim 4, wherein the reactor base plate comprises a first region and a second region, wherein the first region is formed by a plate facing interiorly of the reactor of an intermediate plate which carries the nozzles, and wherein the second region is formed by the intermediate plate and a bottom plate which carries supply connections for the filaments.

6. The reactor as claimed in claim 5, wherein cooling water is conducted in the first region.

7. The reactor as claimed in claim 5, wherein unused monosilane is conducted in the second region, which unused monosilane enters into the reactor through the multiplicity of nozzles in the reactor base plate.

8. The reactor as claimed in claim 5, wherein the supply connections for the filaments are a high-voltage connection and cooling water connections.

9. The reactor as claimed in claim 5, wherein the filaments are located in a graphite adaptor which engages into a graphite clamping ring which itself interacts with the plate via a quartz ring.

10. The reactor as claimed in claim 5, wherein the inner tube is located in a pot on the bottom plate which seals the first region and the second region, and a holder for the inner tube is conducted in the pot, wherein a radial seal seals the pot, the holder and the reactor space from one another.

11. The reactor as claimed in claim 10, wherein a discharge line for the used monosilane is conducted from the inner tube through the holder and the pot, which discharge line discharges the used monosilane below the reactor base plate.

12. The reactor as claimed in claim 1, wherein, in the intermediate space, a first cooling water circuit and a second cooling water circuit are formed, and each cooling water circuit is subdivided by a partition such that in the intermediate space a course of the cooling water is formed from an opening to a slot-shaped opening.

* * * * *